United States Patent [19]

Ueda et al.

[11] 3,869,568

[45] Mar. 4, 1975

[54] SYNCHRONIZATION SEPARATOR CIRCUIT

[75] Inventors: Seiichi Ueda, Tokyo; Teruo Minagawa, Yokohama, both of Japan

[73] Assignee: Hitachi Ltd., Tokyo, Japan

[22] Filed: Mar. 12, 1973

[21] Appl. No.: 340,073

[30] Foreign Application Priority Data

Mar. 10, 1972 Japan .............................. 47-23932

[52] U.S. Cl. .............................. 178/7.3 S, 328/139

[51] Int. Cl. .............................. H04n 5/08

[58] Field of Search ........ 178/7.3 S, 7.5 S, DIG. 12; 307/235 R, 235 A; 328/139

[56] References Cited

UNITED STATES PATENTS

| | | | |
|---|---|---|---|
| 3,524,021 | 8/1970 | Hickok | 178/7.3 S |
| 3,639,780 | 2/1972 | Lovelace | 178/7.3 S |
| 3,706,847 | 12/1972 | Smeulers | 178/7.3 S |
| 3,760,196 | 9/1973 | Nomoto et al. | 328/139 |

*Primary Examiner*—Robert L. Griffin
*Assistant Examiner*—George G. Stellar
*Attorney, Agent, or Firm*—Craig & Antonelli

[57] ABSTRACT

A synchronization signal separator circuit wherein a compound video signal is applied through a peak value detector circuit to one of the input terminals of a differential amplifier, and said compound video signal is applied through a level shift circuit or level shift circuits to said one input terminal or both the input terminals of said differential amplifier.

5 Claims, 9 Drawing Figures

FIG. 7a
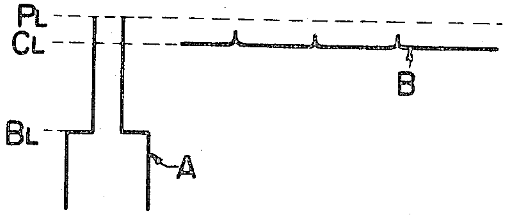
FIG. 7b
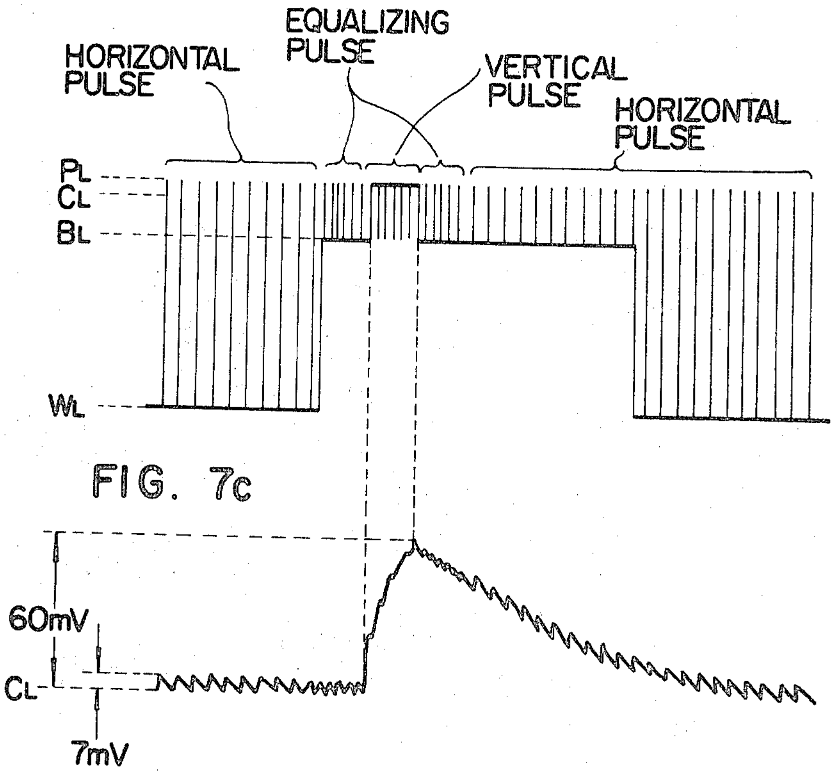
FIG. 7b, FIG. 7c

SYNCHRONIZATION SEPARATOR CIRCUIT

BACKGROUND OF THE INVENTION

1. Field of the Invention

The present invention relates to a synchronization signal separator circuit for separating a synchronizing signal from within a compound video signal.

2. Description of the Prior Art

Television waves are sometimes transmitted in a local relay station, etc. in a form in which the synchronizing signal component is compressed. It is accordingly required to make the synchronization separating level difference $S_L$ small, in order to prevent the synchronization signal from deviating or becoming unstable even in case of receiving the electric waves transmitted from the relay station.

Herein, the expression "synchronization separating level difference $S_L$" refers to the level difference between the peak level $P_L$ of a compound video signal and the level $C_L$ for clipping the compound video signal thereat, as is illustrated in FIG. 1. In the figure, $B_L$ designates the black level of a video signal, and $W_L$ designates the white level. Accordingly, if the synchronization separating level difference $S_L$ is made large, it will be feared, in the case where the synchronizing signal component is compressed as stated above, that the clip level becomes lower than the black level $B_L$ to lead to the deviation in synchronization.

Generally employed as synchronization signal separator circuits are those circuits which determine the synchronization separating level difference $S_L$ by making use of the charging and discharging of a capacitor. They are classified as the base time constant type in which a CR time constant circuit is connected to the base electrode of a transistor and the emitter time constant type in which the CR time constant circuit is connected to the emitter electrode of the transistor.

FIGs. 2 and 3 show examples of the synchronization separator circuits of the base time constant type and the emitter time constant type, respectively.

Both these time constant types of synchronization separator circuits exploit the charging and discharging actions of a capacitor. They cannot reasonably make the synchronization separating level difference $S_L$ small, since the synchronization separating level difference $S_L$ and the stability for the horizontal and vertical synchronizing signals are closely related, and besides, the smallness of the former is contradictory to the latter.

More specifically, if the time constant at the discharge of the capacitor $C_1$ or $C_2$ is made large, the synchronization separating level difference $S_L$ can be made small. As for a signal having a comparatively broad pulse width, such as the vertical synchronizing signal, however, the capacitor $C_1$ or $C_2$ is charged in a slight time, and the transistor $T_2$ or $T_3$ is cut off earlier. It is accordingly impossible to sufficiently separate the vertical synchronizing signal, so that the synchronization deviates or becomes unstable.

On the other hand, if the time constant at the discharge is made small, the synchronization deviation by the foregoing cause can be avoided. In this case, however, the synchronization separating level difference $S_L$ becomes large. Moreover, it is feared that the video signal will appear on the output side along with the synchronizing signal.

SUMMARY OF THE INVENTION

It is accordingly an object of the present invention to provide a synchronization signal separator circuit which can make the synchronization separating level difference small with the aforesaid correlation between the synchronization separating level differnce $S_L$ and the stability of the separated synchronizing signals weakened.

Another object of the present invention is to provide a synchronization signal separator circuit which can separate the horizontal and vertical synchronizing signals substantially equally.

Another object of the present invention is to provide a synchronization signal separator circuit capable of fine adjustment of the sycnhronization separating level difference.

Still another object of the present invention is to provide a synchronization signal separator circuit which is compensated for temperature changes.

The present invention itself and the other objects of the present invention will become apparent from the following description of the preferred embodiments taken in conjunction with the accompanying drawings.

BRIEF DESCRIPTION OF THE DRAWINGS

FIGS. 7(*a*) to 7(*c*) are characteristic diagrams relating to the synchronization separator circuit in FIG. 4.

PREFERRED EMBODIMENTS OF THE INVENTION

Figure 1:
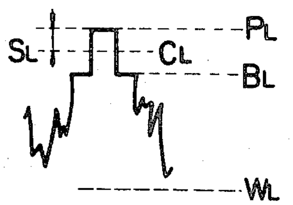
FIG. 1 is a diagram of a compound video signal, the various levels of which have been explained previously.
Figure 2:
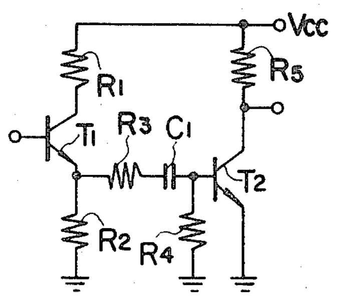
FIG. 2 PRIOR ART
FIGS. 2 and 3 are schematic circuit diagrams of prior art synchronization separator circuits, which already have been described.
Figures 3, 4:
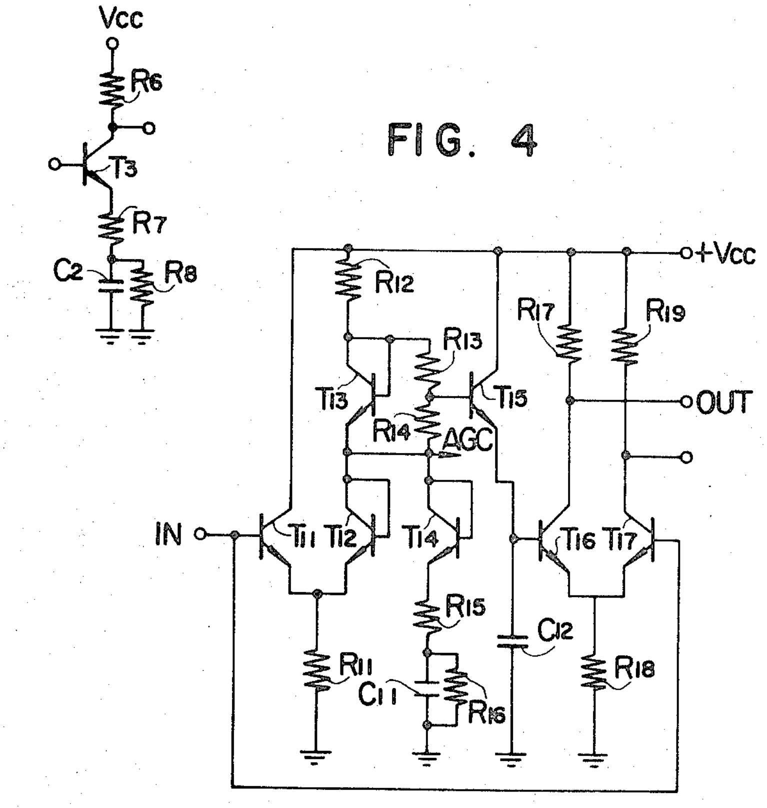
FIG. 3 PRIOR ART, FIG. 4
FIGS. 4 to 6 are schematic circuit diagrams of sycnhronization separator circuits embodying the present invention.

FIG. 4 shows an embodiment of the synchronization separator circuit according to the present invention.

Referring to the figure, the emitter electrodes of transistors $T_{11}$ and $T_{12}$ are both grounded through a resistor $R_{11}$. The base electrode and collector electrode of each of the transistor $T_{12}$ and a transistor $T_{13}$ are short-circuited, and the transistors function as diodes. The anode electrode of the diode $T_{13}$ is connected through a resistor $R_{12}$ to a DC power source $+V_{CC}$, while the collector electrode of the transistor $T_{11}$ is directly connected to the power source $+V_{CC}$. Resistors $R_{13}$ and $R_{14}$ are connected in series between the anode electrode and cathode electrode of the diode $T_{13}$.

A transistor $T_{15}$ has the base electrode connected to the juncture between the resistors $R_{13}$ and $R_{14}$, the collector electrode connected to the power source $+V_{CC}$, and the emitter electrode grounded through a capacitor $C_{12}$.

In order to constitute a constant-current source, transistors $T_{16}$ and $T_{17}$ have both the emitter electrodes grounded through a resistor of high resistance $R_{18}$, and have the respective collector electrodes connected through resistors $R_{17}$ and $R_{19}$ to the power source $+V_{CC}$. The base electrode of the transistor $T_{16}$ is connected to the juncture between the transistor $T_{15}$ and the capacitor $C_{12}$.

A compound video signal is applied from an input terminal IN to the base electrodes of the transistors $T_{11}$ and $T_{17}$.

The transistors $T_{11}$–$T_{13}$ as well as transistor $T_{15}$ and transistor $T_{14}$ and the resistors $R_{11}$–$R_{14}$ constitute a level shift circuit for level-shifting the compound video signal DC-wise. The transistor $T_{15}$ and the capacitor $C_{12}$ constitute a peak value detector circuit for detecting the peak value of the compound video signal which has been level-shifted DC-wise by the level shift circuit. The transistors $T_{16}$ and $T_{17}$ and the resistors $R_{17}$–$R_{19}$ constitute a differential amplifier for comparing the magnitudes of the voltage levels of the inputted compound video signal and a signal which is obtained by level-shifting it DC-wise and further detecting the peak value of the level-shifted signal.

According to the present embodiment, the synchronization signal separator circuit constructed as described above is formed in an integrated semiconductor circuit entirely except for the capacitors.

The operation of the synchronization signal separator circuit thus constructed, will be explained hereunder.

The base electrode of the transistor $T_{16}$ has applied thereto the DC voltage which is obtained by level-shifting the compound video signal and further detecting the peak value of the shifted signal by means of the aforesaid level shift circuit and peak value detector circuit. The DC voltage is represented by $(V_B)T_{16}$, and the time constant at the charging of the capacitor $C_{12}$ is neglected. Then, $$(V_B)T_{16} = P_L - (V_{BE})T_{11} + (V_{BE})T_{12} + R_{14}/R_{13} + R_{14} \, . \, (V_{BE})T_{13} - (V_{BE})T_{15}$$

where $P_L$ denotes the peak level of the compound video signal (namely, that of the synchronizing signal), and $(V_{BE})T_{11}$, $(V_{BE})T_{12}$, $(V_{BE})T_{13}$ and $(V_{BE})T_{15}$ indicate the forward voltage drops of the base-emitter jucntions of the transistors $T_{11}$, $T_{12}$, $T_{13}$ and $T_{15}$, respectively.

Herein, if the transistors $T_{11}$ and $T_{12}$ and the transistors $T_{13}$ and $T_{15}$ are respectively made under the same conditions in the integrated semiconductor circuit, they will have substantially the same characteristics. The DC voltage $(V_B)T_{16}$ is therefore expressed by:

$$(V_B)T_{16} = P_L - R_{13}/R_{13} + R_{14} \, . \, V_{BE} - V_{BE}$$

where $(V_{BE})T_{11} = (V_{BE})T_{12}$ and $(V_{BE})T_{13} = (V_{BE})T_{15} = V_{BE}$.

The clip level $C_L$ and the synchronization separating level difference $S_L$ of the differential amplifier or the synchronization separator circuit can accordingly be set by the resistances $R_{13}$ and $R_{14}$ and the voltage $V_{BE}$ as follows:

$$C_L = (V_B)T_{16} = P_L - R_{13}/R_{13} + R_{14} \, . \, V_{BE} - V_{BE} \; S_L = R_{13}/R_{13} + R_{14} \, . \, V_{BE} - V_{BE}$$

In the general transistorized televison receivers, the peak level $P_L$, black level $B_L$ and white level $W_L$ with respect to the basal potential of the compound video signal applied to the synchronization signal separator circuit can be made, for example, approximately 3.6 V, 3.2 V and 2.2 V, respectively. The respective levels relative to the basal potential can be altered to various values in design. The level difference $(P_L - B_L)$ between the peak level $P_L$ and the black level $B_L$, however, is generally as small a value as approximately 0.2 – 0.4 V in the transistorized television receiver. The synchronization separating level difference $S_L$ need accordingly be of a still smaller value. In this respect, according to the present embodiment, the synchronization separating level difference $S_L$ can be freely set within the range of the forward voltage drop $V_{BE}$ of the base-emitter junction of the transistor. In case of employing silicon as the semiconductor material, the voltage $V_{BE}$ is about 0.7 V. The synchronization separating level difference $S_L$ below 0.2 – 0.4 V can be simply obtained by dividing the voltage by the resistors $R_{13}$ and $R_{14}$.

The charging current flowing through the collector electrode of the transistor $T_{15}$ decreases gradually. The forward base-emitter junction voltage drop of the transistor $T_{15}$ becomes smaller accordingly. Thus, the DC voltage $(V_B)T_{16}$ applied to the transistor $T_{16}$ fluctuates, to give rise to ripples. However, if the synchronization separating level difference $S_L$ is selected to be larger than the variation $(\Delta V_B)T_{16}$ of the DC voltage $(V_B)T_{16}$, no problem will be raised in practical use.

By way of example, in the case where the capacity of the capacitor $C_{12}$ was selected at $0.1 \mu F$, the variation $(\Delta V_B)T_{16}$ was approximately $7 mV$ during the period of the horizontal synchronizing signal and approximately 60 m V during the period of the vertical synchronizing signal, as is illustrated in FIGS. 7(*a*) - 7(*c*). When the resistance ratio between the resistors $R_{13}$ and $R_{14}$ was adjusted to approximately 1 : 6 and the synchronization separating level difference $S_L$ at $(V_{BE})T_{15} = (V_{BE})T_{13}$ was set at about 100 mV, then the horizontal and vertical synchronizing signals were substantially equally separated, and there was no problem in practical use.

In FIG. 7(*a*), A designates the synchronizing signal, while B indicates the DC voltage $(V_B)T_{16}$ impressed on the base electrode of the transistor $T_{16}$. For convenience sake, FIG. 7(*b*) shows the compound video signal at the time when the video signal is at the white level. Shown in FIG. 7(*c*) is the DC voltage wave form $(V_B)T_{16}$ in FIG. 7(*a*) as enlarged in time, the wave form corresponding to the compound video signal illustrated in FIG. 7(*b*).

The synchronization signal separator circuit as in FIG. 4 can produce synchronization-separated outputs compensated for temperature changes, especially in case where it is constructed in the form of integrated semiconductor circuit. More specifically, variations of the voltage drops of the base-emitter junctions of the transistors $T_{11}$ and $T_{12}$ due to a temperature change cancel each other. Those of the transistors $T_{13}$ and $T_{15}$ also act to cancel each other. The synchronization separating level difference $S_L$ is accordingly stable to the temperature change.

In the presennt embodiment, a noise suppressor filter composed of, for example, the diode $T_{14}$, resistors $R_{15}$ and $R_{16}$ and a capacitor $C_{11}$ can be interposed between the anode electrode of the diode $T_{14}$ and ground in FIG. 4. In general, especially in a television receiving set employing a peak value type AGC circuit, a noise canceller circuit is provided on the side of the preceding stage to the synchronization signal separator circuit in order to cancel impulsive noises ascribable to the ignition operation of an automobile, etc. Generally, however, it is difficult to cancel noises having levels slightly higher than the peak value of the synchronizing signal. Although noises at high frequencies are attenuated by a low-pass filter, noises at low frequencies are not perfectly eliminated. In contrast, when the noise suppressor filter as shown in FIG. 4 is incorporated, it functions to suppress substantially to the peak synchronization value the noises higher in level than the peak synchronization value and those at low frequencies as stated above. Signals with the noises thereby suppressed can accordingly be fed into the automatic gain control circuit (AGC circuit). Although it is also considered to locate the noise suppressor filter at the position of the input terminal IN, the location in FIG. 4 is more preferable in order to avoid changes of the input impedance, etc.

Figure 5:
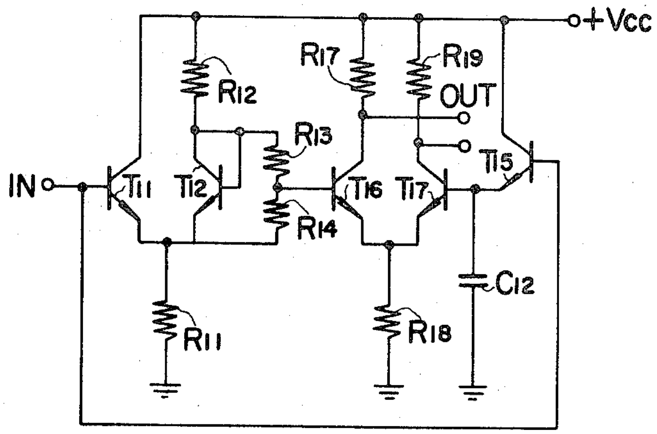

FIG. 5 shows another embodiment of the synchronization signal separator circuit according to the present invention, the embodiment being obtained by somewhat modifying the synchronization signal separator circuit in FIG. 4. In FIG. 4, parts of the same functions as in FIG. 4 are indicated by the same symbols.

Referring to FIG. 5, the transistors $T_{11}$ and $T_{12}$ and the resistors $R_{11} - R_{14}$ constitute a level shift circuit for level-shifting the compound video signal $V_{in}$ DC-wise. The amount of the level shift is adjusted by the resistors $R_{13}$ and $R_{14}$.

The transistor $T_{15}$ and the capacitor $C_{12}$ level-shift the compound video signal DC-wise, and further detect the peak value of the level-shifted signal.

Accordingly, electric potentials $(V_B)T_{16}$ and $(V_B)T_{17}$ impressed on the input electrodes of the transistors $T_{16}$ and $T_{17}$ and the synchronization separating level difference $S_L$ are expressed as follows:

$$(V_B)T_{16} = V_{in} - R_{13}/R_{13} + R_{14} \,.\, V_{BE}$$

$$(V_B)T_{17} = P_L - V_{BE}$$

$$S_L = R_{14}/R_{13} + R_{14} \,.\, V_{BE}$$

Figure 6:
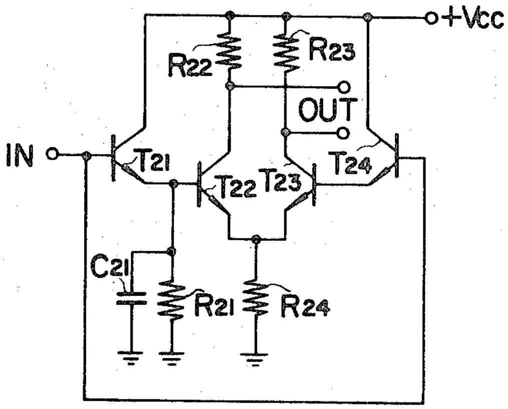

FIG. 6 shows still another embodiment of the synchronization separator circuit according to the present invention.

Referring to the figure, transistors $T_{22}$ and $T_{23}$ and resistors $R_{22}$ - $R_{24}$ constitute a differential amplifier.

The collector electrode of a transistor $T_{21}$ is connected to the power source + $V_{CC}$, while the emitter electrode is grounded through a capacitor $C_{21}$ and a resistor $R_{21}$ which are connected in parallel with each other.

The base electrodes of the transistor $T_{21}$ and a transistor $T_{24}$ are applied thereto with the compound video signal, while the emitter electrodes of the respective transistors are connected to the base electrodes of the transistors $T_{22}$ and $T_{23}$.

The transistor $T_{21}$, capacitor $C_{21}$ and resistor $R_{21}$ level-shift the compound video signal DC-wise, and further detect the peak value of the shifted signal.

Although the transistor $T_{24}$ also level-shifts the compound video signal DC-wise, the level shift amount thereof is set to be smaller than that of the transistor $T_{21}$.

In accordance with the present embodiment, the difference between the voltage drops of the base-emitter junctions of the transistors $T_{21}$ and $T_{24}$ as is attendant upon the difference between currents flowing through the collector electrodes of the respective transistors is utilized, and it determines the synchronization separating level difference $S_L$. The resistor $R_{21}$ adjusts the collector current flowing through the transistor $T_{21}$ or adjusts the synchronization separating level difference $S_L$. By way of example, if the collector currents of the transistors $T_{21}$ and $T_{24}$ are respectively adjusted to approximately 1 – 2 mA and 10 – 100 $\mu$A, the synchronization separating level difference $S_L$ will become about 0.1 – 0.2 V. In order to adjust the synchronization separating level difference, a resistor may be interposed between the emitter electrode of the transistor $T_{24}$ and the ground.

With such construction, changes of the voltage drops of the base-emitter junctions of the trnasistors $T_{21}$ and $T_{24}$ and due to a temperature change act so as to cancel each other. Thus, the synchronization separating level difference $S_L$ is stabilized.

As described above, in accordance with the present invention, the synchronization separating level difference $S_L$ is set, not by the charging and discharging of a capacitor, but by means of a level shift circuit utilizing voltage drops of diodes or P-N junctions of transistors, etc. The synchronization separating level difference $S_L$ can therefore be determined comparatively freely.

We claim:

1. A synchronization signal separator circuit for deriving a synchronization signal from a compound video signal comprising a differential amplifier having first and second input terminals, a circuit input terminal receiving said compound video signal, and means for connecting said circuit input terminal to said first and second input terminals of said differential amplifier including D.C. level shift and peak value detector circuit means, wherein said D.C. level shift and peak value detector circuit means comprises a D.C. level shift circuit having its input connected to said circuit input terminal and a peak value detector connected between the output of said D.C. level shift circuit and said first input terminal of said differential amplifier, said circuit input terminal being connected directly to said second input terminal of said differential amplifier, and wherein said D.C. level shift circuit comprises first and second transistors having their emitters connected together through a first resistor to ground, the collector of said first transistor being connected to a power source, the collector of said second transistor being connected to the base thereof, a third transistor having its collector connected to its base and through a second resistor to said power source, the emitter of said third transistor being connected to the collector of said second transistor, and third and fourth resistors connected in series across the collector and emitter of said third transistor, the point of connection between said third and fourth resistors being connected to said peak value detector circuit.

2. A synchronization signal separator circuit as defined in claim 1, wherein said D.C. level shift circuit further comprises a fourth transistor having its collector connected to its base and to the collector of said second transistor, and a noise suppressor circuit including a capacitor in parallel with a fifth resistor connected from ground through a sixth resistor to the emitter of said fourth transistor.

3. A synchronization signal separator circuit for deriving a synchronization signal from a compound video signal comprising a differential amplifier having first and second input terminals, a circuit input terminal receiving said compound video signal, and means for connecting said circuit input terminal to said first and second input terminals of said differential amplifier including D.C. level shift and peak value detector circuit means, wherein said D.C. level shift and peak value detector circuit means comprises a D.C. level shift circuit having its input connected to said circuit input terminal and its output connected to said first input terminal of said differential amplifier and a peak value detector connected between said circuit input terminal and said second input terminal of said differential amplifier, and wherein said D.C. level shift circuit comprises first and second transistors having their emitters connected together through a first resistor to ground, the collector of said first transistor being connected to a power source, the collector of said second transistor being connected to the base thereof and through a second resistor to said power source, and third and fourth resistors connected in series across the collector and emitter of said second transistor, the point of connection of said third and fourth resistors being connected to said first input terminal of said differential amplifier.

4. A synchronization signal separator circuit for deriving a synchronization signal from a compound video signal comprising a differential amplifier having first and second input terminals, a circuit input terminal receiving said compound video signal, a first transistor having its base directly connected to said circuit input terminal, its collector connected to a power source, and its emitter connected through the parallel combination of a first resistor and a capacitor to ground and directly connected to said first input terminal of said differential amplifier, and a second transistor having its collector connected to said power source, its base directly connected to said circuit input terminal and its emitter directly connected to said second input terminal of said differential amplifier.

5. A synchronization signal separator circuit as defined in claim 4, further including means for setting the level shift amount of said second transistor to be smaller than that of said first transistor.

* * * * *